3,663,498
THERMOPLASTIC MOULDING COMPOSITIONS ON THE BASIS OF SATURATED POLYESTERS
Rudolf Uebe, Hofheim, Taunus, and Ludwig Brinkmann, Frankfurt am Main, Germany, assignors to Farbwerke Hoechst Aktiengesellschaft vormals Meister Lucius & Bruning, Frankfurt am Main, Germany
No Drawing. Filed Aug. 28, 1970, Ser. No. 68,048
Claims priority, application Germany, Sept. 5, 1969, P 19 45 102.6
Int. Cl. C08g 17/00
U.S. Cl. 260—40 R        12 Claims

ABSTRACT OF THE DISCLOSURE

Moulding compositions are prepared on the basis of linear saturated polyesters, inert inorganic solid substances, and alkali metal aralkyl sulfonates, which are suitable for processing in the thermoplastic range, and from which shaped articles having good mechanical properties can be manufactured exhibiting a very good surface quality and not showing any discoloration, which come off the mould already after a short dwell time in the mould, a fact that makes them particularly suitable for the manufacture of complex shaped articles.

---

The present invention provides thermoplastic moulding compositions on the basis of saturated polyesters.

It is known that polyesters from aromatic dicarboxylic acids and aliphatic or cyclo-aliphatic diols can be processed to give crystallized shaped articles by means of injection-moulding. Polyesters from terephthalic acid and ethylene glycol are of special interest. However, in order to obtain a technically useful moulding composition on the basis of the polyester raw material, specific properties have to be attained. Thus, for example, it is required that the polyester crystallizes fast in the mould, in order to ensure the necessary hardness, as well as the stability of shape and the dimensional stability which are of great importance for this material. Moreover, the injection-moulding process is required to proceed automatically up to the ejection of the manufactured part; the moulded articles must fall off the mould without any manual support. These requirements can partly be met by operating the injection-moulding machine accordingly. The heating of the mould, for example, strongly influences the increase of the crystallization rate. However, the very heating leads to an intensified sticking to the mould of the shaped articles made from polyesters that are still soft, which means that the machine cannot be operated in such a way as to produce injection-moulded articles without fault. It is, therefore, necessary to modify the polyester raw material in an appropriate manner by means of additives.

Thus, for example, in British Pat. No. 1,104,089 it has been proposed to admix finely divided, solid inorganic substances to polyethylene terephthalate in order to increase its rate of crystallization. However, crystallization-promoting substances do not, at the same time, show a favorable effect as to the removal of the moulded articles from the mould. It is, therefore, necessary to improve the mould release properties of injection-moulded articles on the basis of thermoplasticpolyesters by means of other modifying agents.

Now is has been found that thermoplastic moulding compositions consisting of (a) linear saturated polyesters of aromatic dicarboxylic acids and, optionally, up to 10 mol percent, calculated on the total amount of dicarboxylic acids, of aliphatic dicarboxylic acids with saturated aliphatic or cyclo-aliphatic diols, (b) from 0.05 to 2% by weight, preferably from 0.1 to 0.5% by weight, calculated on the amount of polyesters, of inert inorganic solid substances having a particle size of less than $5\mu$, (c) from 0.02 to 8% by weight, preferably from 0.05 to 1% by weight, calculated on the amount of polyesters, of an alkali metal aralkyl sulfonate of the general formula

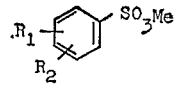

in which $R_1$ and $R_2$ may be present in any place of the aromatic ring and can represent saturated or unsaturated straight-chain or branched hydrocarbon radicals having up to 18 carbon atoms, one of the radicals possibly being a hydrogen atom, have excellent properties as injection-moulding material.

The alkali metal aralkyl sulfonates of the invention are excellent mould release agents for injection-moulded articles on the basis of thermoplastic polyesters. Even more complex moulded articles come off the mould automatically, with the short dwell times in the mould required, which strongly influences the economy of the process. At the same time the surface condition of the moulded articles obtained is of a particularly high quality. Of special importance, however, is the fact that these mould release agents are chemically inert and do not cause any degradation of the polyester material, nor do they produce a discoloration of the injection-moulded article.

Polyethylene terephthalate is preferably used as linear polyester. Yet other polyesters, for example poly-cyclohexane-(1,4)-dimethylol terephthalate, may also be used. Moreover, suitable are modified polyethylene terephthalates, which contain, besides terephthalic acid, also other aromatic or aliphatic dicarboxylic acids as structural units, for example isophthalic acid, naphthalene dicarboxylic acid-(1,6), or adipic acid. Besides, modified polyethylene terephthalates can be used, which contain, in addition to ethylene glycol, also other aliphatic diols, such as neopentyl glycol or butanediol-(1,4), as alcoholic component. Polyesters from hydroxycarboxylic acids may also be used. The polyesters should have a reduced specific viscosity (measured with a solution of 1% strength in phenol and tetrachlorethane 60:40 at 25° C.) of from 0.9 to 1.6 dl./g. Especially suitable are polyesters having a reduced specific viscosity of between 1.1 and 1.5 dl./g.

Suitable inorganic inert solid substances are, for example, silicates, such as glass powder, talcum and kaolin; metal oxides, for example, magnesium oxide, antimony oxide, titanium dioxide, aluminium oxide, calcium carbonate, having a particle size of less than $5\mu$.

Suitable alkali metal aralkyl sulfonates are the sodium salts of p-toluene sulfonic acid, 2,4-dimethyl-benzene-sulfonic acid, p-cumene-sulfonic acid, ortho- or para-n-butyl-benzene-sulfonic acid, ortho- or para-n-octyl-benzene-sulfonic acid, ortho- or para-n-dodecyl-benzene-sulfonic acid, isododecyl-benzene-sulfonic acid. Besides sodium salts, other alkali metal salts can also be used, such as lithium or potassium salts.

In order to improve the impact strength, suitable high-polymers may be added to the polyester mass in known manner, for example, copolymers of ethylene with vinyl acetate, ethylene with acrylic esters or butadiene with styrene.

There are different ways of preparing the moulding composition of the invention. The alkali metal sulfonates can be added at the beginning of the esterification or ester interchange, or at any time during polycondensation. The abovementioned substances can also be applied by rolling onto the finished polyester granules, and then incorporated into the polyester mass by melting on an extruder and subsequently granulating. A third possibility consists in simply rolling the alkali metal sulfonates onto the polyester granules before the injection-moulding process.

In principle, the crystallization promoting agent can be added at the same time and in the same way as the alkali metal sulfonate. However, it may also be incorporated separately into the polyester, or applied by rolling onto the polyester granules, at a different stage of the process or by a separate operation.

A general rule of operation provides that all steps have to be performed with the exclusion of moisture in order to avoid degradation of the polyester. The polyester mass shall preferably contain less than 0.01% of water. If a fast crystallization is to be obtained in the mould, it is necessary to maintain the mould at a temperature of at least 100° C. Mould temperatures beaween 120° and 150° C. are most favourable.

The following examples serve to illustrate the invention, the parts and percentages being by weight.

EXAMPLE 1

1.1. A mixture consisting of 1,000 parts of dimethyl terephthalate and 800 parts of ethylene glycol was slowly heated to 225° C., while stirring, in the presence of an ester interchange catalyst. Methanol was distilled off by means of a column, until the ester interchange was completed. By raising the temperature to 270° C., the excess ethylene glycol was separated by distillation. After 2 parts of sodium-p-dodecyl sulfonate, 4 parts of talcum and 0.04 part of a condensation catalyst (for example $Sb_2O_3$ or $GeO_2$) had been added, the polycondensation was carried out with an increase of temperature to 275° C. and with a final pressure of 0.1 mm. of mercury. This operation had to be effected, while steadily controlling the reaction mixture, because of the danger of a foaming-over. The final polyester had a reduced specific viscosity of from 0.8 to 0.9 dl./g. After it had been discharged from the reaction vessel, the polyester strand was granulated, and the granules thus obtained were brought to a reduced specific viscosity (RSV) of 1.40 dl./g. by means of solids condensation at 235° C. and a pressure of from 0.1 to 0.2 mm. of mercury.

1.2. The polyester moulding composition thus obtained was moulded into 100 sheets of the dimensions 60 x 60 x 2 mm. and into 100 gear wheels (root circle diameter: 104 mm., top circle diameter: 114 mm., circular pitch: 54, tooth thickness: 5 mm). The following injection-moulding conditions were adjusted: cylinder temperature: 270° C./ 260° C./260° C., mould temperature: 140° C., injection time: 15 seconds, injection pressure: 140 atmospheres gauge. The dwell time in the mould was varied, in the case of the sheets, from 5 to 25 seconds, and in the case of the gear wheels, from 20 to 60 seconds. With a dwell time of 5 seconds, 95 sheets fell off the mould, with 15 and 25 seconds all 100 sheets were ejected automatically. The sheets exhibited an excellent surface gloss, and there were no impression marks left by the ejector pins. The reduced specific viscosity of the sheets was 1.270 dl./g. Of the gear wheels, 94 parts were ejected automatically with a dwell time in the mould of 20 seconds, whereas 6 wheels had to be removed by hand. With a dwell time in the mould of 40 and 60 seconds, all parts fell off the mould. The reduced specific viscosity of the gear wheel material was 1.250 dl./g.

EXAMPLE 2

2.1. The ester interchange was effected analogous to Example 1.1. Subsequent to the ester interchange, 4 parts of talcum were stirred into the reaction mixture, and the polycondensation was carried out rapidly. After the polyester mass had been discharged, the strand was granulated, and solids condensation was performed until an RSV of 1.420 was reached.

2.2. The polyester granules thus obtained were rolled with 2 parts of sodium-p-toluene sulfonate for 6 hours in a drum with the exclusion of air and moisture. A prerequisite for the desired efficiency of the p-toluene sulfonate is its regular distribution on the granules; for this reason, the sulfonate was finely ground before being used. The moulding composition thus obtained was moulded into sheets and gear wheels, under the same conditions as indicated in Example 1.2. The mould release properties and the surface quality of the injection-moulded articles obtained were excellent. Of the sheets, all 100 parts fell off the mould automatically with a dwell time in the mould of 15 and 25 seconds; the reduced specific viscosity of the sheet material was 1.260 dl./g. Of 100 gear wheels, 92 parts fell off the mould automatically with a dwell time of 20 seconds; with a dwell time of 40 and 60 seconds, no part was left sticking to the mould. The reduced specific viscosity was 1.230 dl./g.

2.3. For reasons of comparison, the polyester moulding composition prepared in accordance with paragraph 2.1, which contained 4 parts of talcum, was moulded into sheets and gear wheels without any addition of sodium-p-toluene sulfonate. The moulding conditions were adjusted in the same way as in Example 1.2. However, in order to obtain fairly satisfactory moulded articles, the dwell times in the mould had to be considerably prolonged. The moulded articles nevertheless stuck to the mould, and their surfaces showed deep impression marks of the ejector pins. Of 100 sheets, only 18 fell off the mould automatically with a dwell time of 25 seconds, the others had to be removed from the mould by hand; with a dwell times of 45 seconds, 38 sheets of 100 fell off the mould, while with a dwell times of 60 seconds, 46 sheets of 100 fell off the mould. The reduced specific viscosity of the sheet material was 1.290 dl./g. With the gear wheels, the following conditions were found: with a dwell time of 60 seconds, only 42 wheels of 100 fell off the mould automatically; with a dwell time of 90 seconds, 55 fell off, while with a dwell time of 120 seconds, the number of wheels falling off the mould automatically was 69. The reduced specific viscosity was 1.25 dl./g.

EXAMPLE 3

3.1. At first, a polyethylene terephthalate having an RSV of 1.45 dl./g. was prepared analogous to Example 1.1, however, without the addition of a crystallization promoting agent or of a sulfonate.

3.2. 4 parts of a commercial calcium-magnesium-aluminium-silicate composed of 32.27% of $SiO_2$, 18.43% of CaO, 17.42% of MgO, 9.11% of $Al_2O_3$, 1.24% of $Na_2O$, annealing loss: 20.05%, as crystallization promoting agent, as well as 2 parts of sodium-p-cumene sulfonate were applied by rolling onto the polyester raw material at the same time for 6 hours; subsequently the material was processed to give sheets and gear wheels, in accordance with Example 1.2. Of 100 sheets, 90 fell off the mould automatically with a dwell time in the mould of 5 seconds; with 15 seconds, 94 sheets, and with 25 seconds, 98 fell off the mould. The reduced specific viscosity measured on these sheets was 1.24 dl./g. Of 100 gear wheels, 91 came off the mould automatically with a dwell time in the mould of 20 seconds; with 40 seconds, 96, and with 60 seconds, 100 wheels fell off the mould automatically; the reduced specific viscosity of this material was 1.23 dl./g.

What is claimed is:

1. Thermoplastic moulding compositions adapted to be used for injection-moulding purposes which consist of
   (a) linear saturated polyesters of (1) aromatic dicarboxylic acids which may contain up to 10 mol percent, calculated on the total amount of dicarboxylic acids, of aliphatic dicarboxylic acids and (2) saturated aliphatic or cyclo-aliphatic diols, and
   (b) from 0.05 to 2% by weight, calculated on the amount of polyesters, of inert inorganic solid substances having a particle size of less than $5\mu$, and (c) from 0.02 to 8% by weight, calculated on the amount of polyesters, of an alkali metal aralkyl sulfonate of the general formula

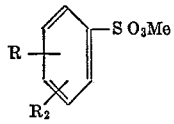

in which $R_1$ and $R_2$ may represent saturated or unsaturated straight-chain or branched hydrocarbon radicals having up to 18 carbon atoms and one of $R_1$ and $R_2$ may be a hydrogen atom.

2. Thermoplastic moulding compositions for injection-moulding purposes as claimed in claim 1, wherein the polyester is polyethylene terephthalate.

3. Thermoplastic moulding compositions for injection-moulding purposes as claimed in claim 1, wherein the polyester is polycyclo-hexane-(1,4)-dimethylol terephthalate.

4. Thermoplastic moulding compositions for injection-moulding purposes as claimed in claim 1, wherein the polyester is a modified polyethylene terephthalate which contains, besides terephthalic acid, isophthalic acid, naphthalene dicarboxylic acid-(1,6), or adipic acid, as structural units.

5. Thermoplastic moulding compositions for injection-moulding purposes as claimed in claim 1, wherein the polyester is a modified polyethylene terephthalate which contains, besides ethylene glycol, neopentyl glycol or butanediol-(1,4), as alcoholic component.

6. Thermoplastic moulding compositions for injection-moulding purposes as claimed in claim 1, wherein the polyester has a reduced specific viscosity of from 0.9 to 1.6 dl./g., measured with a solution of 1% strength in phenol and tetrachlorethane 60:40 at 25° C.

7. Thermoplastic moulding compositions for injection-moulding purposes as claimed in claim 1, wherein the polyester has a reduced specific viscosity of from 1.1 to 1.5 dl./g., measured with a solution of 1% strength in phenol and tetrachlorethane 60:40 at 25° C.

8. Thermoplastic moulding compositions for injection-moulding purposes as claimed in claim 1, wherein the inert inorganic solid substance is a compound selected from the group consisting of glass powder, talcum, kaolin, magnesium oxide, antimony oxide, titanium dioxide, aluminium oxide, calcium carbonate, the particle size being less than 5μ in each case.

9. Thermoplastic moulding compositions for injection-moulding purposes as claimed in claim 1, wherein the alkali metal aralkyl sulfonates are sodium salts of acids selected from group consisting of: p-toluene-sulfonic acid, 2,4 - dimethylbenzene-sulfonic acid, p-cumene-sulfonic acid, ortho- or para-n-butyl-benzene-sulfonic acid, ortho- or para-n-octyl-benzene-sulfonic acid, ortho- or para-n-dodecyl-benzene-sulfonic acid, and isododecyl-benzene-sulfonic acid.

10. Thermoplastic moulding compositions for injection-moulding purposes as claimed in claim 1, wherein the alkali metal aralkyl sulfonates are lithium salts of acids selected from the group consisting of p-toluene-sulfonic acid, 2,4-dimethyl-benzene-sulfonic acid, p-cumene-sulfonic acid, ortho- or para-n-butyl-benzene-sulfonic acid, ortho- or para-n-octyl-benzene-sulfonic acid, ortho- or para-n-dodecyl-benzene-sulfonic acid, and isododecyl-benzene-sulfonic acid.

11. Thermoplastic moulding compositions for injection-moulding purposes as claimed in claim 1, wherein the alkali metal aralkyl sulfonates are potassium salts of acids selected from the group consisting of p-toluene-sulfonic acid, 2,4-dimethyl-benzene-sulfonic acid, p-cumene-sulfonic acid, ortho- or para-n-butyl-benzene-sulfonic acid, ortho- or para-n-octyl-benzene-sulfonic acid, ortho- or para-n-dodecyl-benzene-sulfonic acid, and isododecyl-benzene-sulfonic acid.

12. Shaped articles manufactured in accordance with the injection-moulding method from thermoplastic moulding compositions as claimed in claim 1.

References Cited

UNITED STATES PATENTS

| 3,479,318 | 11/1969 | Jackson et al. | 260—40 R |
| 2,926,142 | 2/1960 | Eccles et al. | 260—505 S X |
| 3,476,698 | 11/1969 | Osterrieth et al. | 260—30.8 X |
| 3,516,957 | 6/1970 | Gray et al. | 260—40 R X |
| 3,018,272 | 1/1962 | Griffing | 260—75 S |
| 3,432,472 | 3/1969 | Caldwell | 260—75 S |

OTHER REFERENCES

J. R. Caldwell, Def. Publ. T862017, May 27, 1969.

MORRIS LIEBMAN, Primary Examiner

S. M. PERSON, Assistant Examiner

U.S. Cl. X.R.

260—75 S